(12) United States Patent
Hayasaka et al.

(10) Patent No.: US 8,239,931 B2
(45) Date of Patent: Aug. 7, 2012

(54) COMMUNICATION APPARATUS, A FIREWALL CONTROL METHOD, AND A FIREWALL CONTROL PROGRAM

(75) Inventors: Mamiko Hayasaka, Tokyo (JP); Yoshinori Unno, Shizuoka (JP); Masanobu Kawashima, Shizuoka (JP)

(73) Assignees: NEC Corporation, Tokyo (JP); NEC Access Technica, Ltd., Shizuoka (JP)

( * ) Notice: Subject to any disclaimer, the term of this patent is extended or adjusted under 35 U.S.C. 154(b) by 815 days.

(21) Appl. No.: 12/362,327

(22) Filed: Jan. 29, 2009

(65) Prior Publication Data

US 2009/0199291 A1  Aug. 6, 2009

(30) Foreign Application Priority Data

Feb. 6, 2008  (JP) .................................. 2008-27093

(51) Int. Cl.
*H04L 29/06*  (2006.01)
(52) U.S. Cl. ................ 726/13; 726/14; 726/15; 726/11; 726/12; 713/151; 713/152; 713/153; 713/154
(58) Field of Classification Search ..................... 726/13
See application file for complete search history.

(56) References Cited

FOREIGN PATENT DOCUMENTS

| JP | 2004172931 A | 6/2004 |
|---|---|---|
| JP | 2004304371 A | 10/2004 |
| JP | 2006134151 A | 5/2006 |
| JP | 207018479 A | 1/2007 |
| WO | 2007007546 A | 1/2007 |
| WO | WO 2007/007546 A1 * | 1/2007 |

OTHER PUBLICATIONS

Japanese Office Action for JP2008-027093 issued Nov. 7, 2009.

* cited by examiner

*Primary Examiner* — Longbit Chai
(74) *Attorney, Agent, or Firm* — Michael Dryja

(57) ABSTRACT

A communication apparatus used in a plurality of networks is disclosed. The communication apparatus includes a firewall which allows communication with outside of the communication apparatus when disabled, and prohibits communication with outside of the communication apparatus when enabled. Then, the communication apparatus includes a firewall control unit which acquires a first MAC address of a first default gateway provided for a predetermined specific network and a second MAC address of a second default gateway provided for a network in which the communication apparatus is being connected, and controls the firewall according to a result of comparison of the first MAC address and the second MAC address.

9 Claims, 11 Drawing Sheets

COMMUNICATION APPARATUS, A FIREWALL CONTROL METHOD, AND A FIREWALL CONTROL PROGRAM

This application is based upon and claims the benefit of priority from Japanese patent application No. 2008-027093, filed on Feb. 6, 2008 the disclosure of which is incorporated herein in its entirety by reference.

TECHNICAL FIELD

The present invention relates to a firewall control method, and particularly relates to a firewall control method of communication apparatus for a VPN (Virtual Private Network) appliance.

BACKGROUND ART

As a firewall control method of communication apparatus for a VPN (Virtual Private Network) appliance to be used in a network constructed by private companies, public corporations or other organization (hereinafter such a network is called as an intranet), an IP (Internet Protocol) address matching method is known. This method uses a source IP address of sender's communication apparatus to determine whether the communication apparatus is used in the intranet or used in the outside network of intranet. However, there is a case that the IP address matching method misjudges that the communication apparatus is used in the intranet in spite of being used in the outside network of intranet. This case happens if the communication apparatus is connected to a local area side (LAN port) of NAT (Network Address Translation) router which is provided in the outside network of intranet. As a result, a firewall function of the communication apparatus is not enabled, and direct access from the communication apparatus to the internet becomes possible, and it causes a deterioration of the security.

PC (Personal Computer), especially notebook type PC is a typical example of the communication apparatus, and it sometimes moved to any places by user's hand carry. Recently, most of companies do not allow to using an individual person's PC inside of the intranet, or PC to be used inside of the intranet should have a firewall function which is disabled inside of the intranet and enabled outside of the intranet. That is, for such a PC, access to the internet is only allowed through the intranet, and it is prohibited to access the internet when the PC is moved to other palace than the intranet environment. This is measures to prevent a computer virus from entering the PC.

For example, in the IP address matching method, a network administrator (hereinafter, administrator) sets in advance a range of the IP address (network address) which defines the intranet to each of communication apparatuses to be used inside of the intranet. When starting communication, the communication apparatus compares the IP address which is assigned to an interface (communication port) and the network address which is set by the administrator in advance. If the assigned IP address is included in the network address, it judges that the communication apparatus is connected to the intranet and the firewall function is disabled in the communication apparatus. If the assigned IP address is not included in the network address, it judges that the communication apparatus is connected to the outside network of the intranet and the firewall function is enabled in the communication apparatus.

In the intranet, the administrator usually assigns "192.168.0.0/16", "172.16.0.0/12" and "10.0.0.0/8" to the communication apparatus as the local address, a router is used as a default gateway and the NAT (Network Address Translation) function is enabled in the router. The administrator recognizes this local address as the intranet and sets it to each of the communication apparatuses. When the communication apparatus is connected to the intranet and used in the intranet, the IP address assigned to the communication port of communication apparatus will be the local address, and both of them (the assigned IP address and the network address) coincide clearly, and the communication apparatus judges that it is used in the intranet and it disables the firewall function provided in the communication apparatus. When the communication apparatus is connected to any of outside networks other than the intranet, the IP address assigned to the communication port of the communication apparatus will be a global IP address which is different from the local address, and there are no cases that both of them (the assigned IP address and the network address) coincide, and the communication apparatus judges that it is used in the outside network of the intranet and enables the firewall function provided in the communication apparatus to prohibit communication to the outside.

However, even if the communication apparatus is connected to the outside network of the intranet, when the NAT router is made setting which gives a local address to the communication port of the communication apparatus and when the same operation as the above is followed, the communication apparatus judges that it is used in the intranet. As the result, the firewall function of the communication apparatus is not enabled contrary to administrator's intention, and direct access from the communication apparatus to the internet environment becomes possible, then it causes a deterioration of the security as described above. Thus, in the IP address matching method, there is in danger of performing misjudgment. As the result of misjudgment, the firewall function provided in the communication apparatus does not work properly and the security is deteriorated.

Further, here, although NAT (Network Address Translation) is used for an example of description, it is similar the case where NAPT (Network Address Port Translation) is used instead of NAT. At the specification table or the like of broadband router, it is indicated with "NAT function being equipped" by the meaning of the NAPT. As an example of NAPT, there is an IP masquerade.

Technology about network security and technology about default gateway are disclosed in the following documents.

As a related art, "a firewall system corresponding to dynamic IP address allocation" is disclosed in Japanese Patent Application Laid-Open No. 2004-172931.

This related art is a technology about a firewall which prohibits access to the internet from a terminal using a dynamically allocated IP address in which allocation time limit has been expired. According to this technology, the internet access control information which shows what kind of internet access is permitted based on each MAC (Media Access Control) address is registered in the firewall only while an IP address with time limit is being allocated to the terminal by an access control server, or only until the time when the dynamically allocated IP address is returned by the terminal itself. As a result, the MAC address basis control of terminal for access to the internet becomes possible. Therefore, access to the internet is prohibited for the terminal using an invalid IP address with allocation time limit being expired.

"A layer 2 switching device" is disclosed in Japanese Patent Application Laid-Open No. 2004-304371.

This related art is a technology about a layer 2 switching device which respectively connects a first host and a second host each belonging to a different LAN (Local Area Network)

segment to a virtual router as a default gateway for these first and second hosts. According to this technology, the layer 2 switching device includes a flow-table in which an entry of a sender IP address, which is one of the first host IP address and the second host IP address, and a destination MAC address and a destination IP address, which are the MAC address and IP address of the other host, are registered. The layer 2 switching device also includes converting means and transmitting means. The converting means converts a destination MAC address included in received data to a MAC address of the other host based on an entry of the flow-table when the received data is transmitted from one of the first host and the second host, wherein the received data includes one of the first host IP address and the second hosts IP address as the sender IP address, and also includes the IP address of the other host as the destination IP address. The transmitting means transmits the data in which the destination MAC address has been converted to the other side of host. As a result, in communication between the first host and the second host, data transmitted from one of these hosts to the other host can be transmitted without passing through the virtual router.

"An equipment authentication apparatus and computer program" are disclosed in Japanese Patent Application Laid-Open No. 2006-134151.

This related art is a technology for preventing equipment, which is connected to a network and illegally moved to other location in the network, from being used. According to this technology, a MAC address, network path information and routing information of a neighboring network equipment is detected and judgment data is generated when the equipment is connected to the network at the first time. After the judgment data is generated, the equipment generates location data based on the MAC address, network path information and routing information of the neighboring network equipment which are detected in every predetermined period time. Then, the equipment compares the location data with the judgment data, and if one of concordance rates of MAC address, network path information, and routing information is smaller than a threshold value, it is judged that the equipment has moved and the equipment stops its own function by itself. As a result, use of the equipment at a proper location is maintained, and use of the equipment at improper locations can be prevented.

"Optimization of e-mail sending and receiving by location information" is disclosed in Japanese Patent Application Laid-Open No. 2007-018479.

This related art is a technology about sending and receiving of e-mails, and this technology can send and receive an e-mail which is suitable for a location where a terminal is being used by adding the location information of terminal to certain information to be handled for e-mail sending and receiving. According to this technology, the terminal discriminates its location where it is being used by knowing a MAC address of default gateway which is needed for connecting to a network, and when the terminal (such as PC, PDA, a cellular phone equipped with wireless LAN, an IP cellular phone and a game machine) is connected to the network, a dedicated server is used to receive the location information as well as authentication information of the terminal. As a result, sending and receiving the e-mail suitable for the location where the terminal is being used can be realized.

SUMMARY

An exemplary object of the present invention is to provide a communication apparatus, a firewall control method and a firewall control program which can control a firewall function of the communication apparatus properly for maintaining a strict security of business communication environment by judging the use position of the communication apparatus correctly based on a pair of MAC addresses of the default gateway of a specific local network such as the intranet and the default gateway of other network.

The communication apparatus according to an exemplary aspect of the invention includes a firewall which allows communication with outside of the apparatus when disabled, and prohibits communication with outside of the apparatus when enabled. Then, the communication apparatus includes a firewall control unit which acquires a first MAC address of a first default gateway which is provided for a predetermined specific network and a second MAC address of a second default gateway which is provided for a network in which the communication apparatus is being connected, and controls the firewall according to a result of comparison of the first MAC address and the second MAC address.

A method of controlling a firewall provided in a communication apparatus which is used in a plurality of networks according to an exemplary aspect of the invention includes, a first acquiring step for acquiring a first MAC address of a first default gateway which is provided for a predetermined specific network; a second acquiring step for acquiring a second MAC address of a second default gateway which is provided for a network in which the communication apparatus is currently being connected; a comparing step for comparing the first MAC address and the second MAC address; and a controlling step for disabling the firewall when the first MAC address and the second MAC address are identical, and enabling the firewall when the first MAC address and the second MAC address are not identical, as a result of comparison of the comparing step, wherein, communication with outside of the communication apparatus is allowed when the firewall is disabled, and communication with outside of the communication apparatus is prohibited when the firewall is enabled.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

A first exemplary embodiment will be described with reference to accompanying drawings below.

Figure 1:
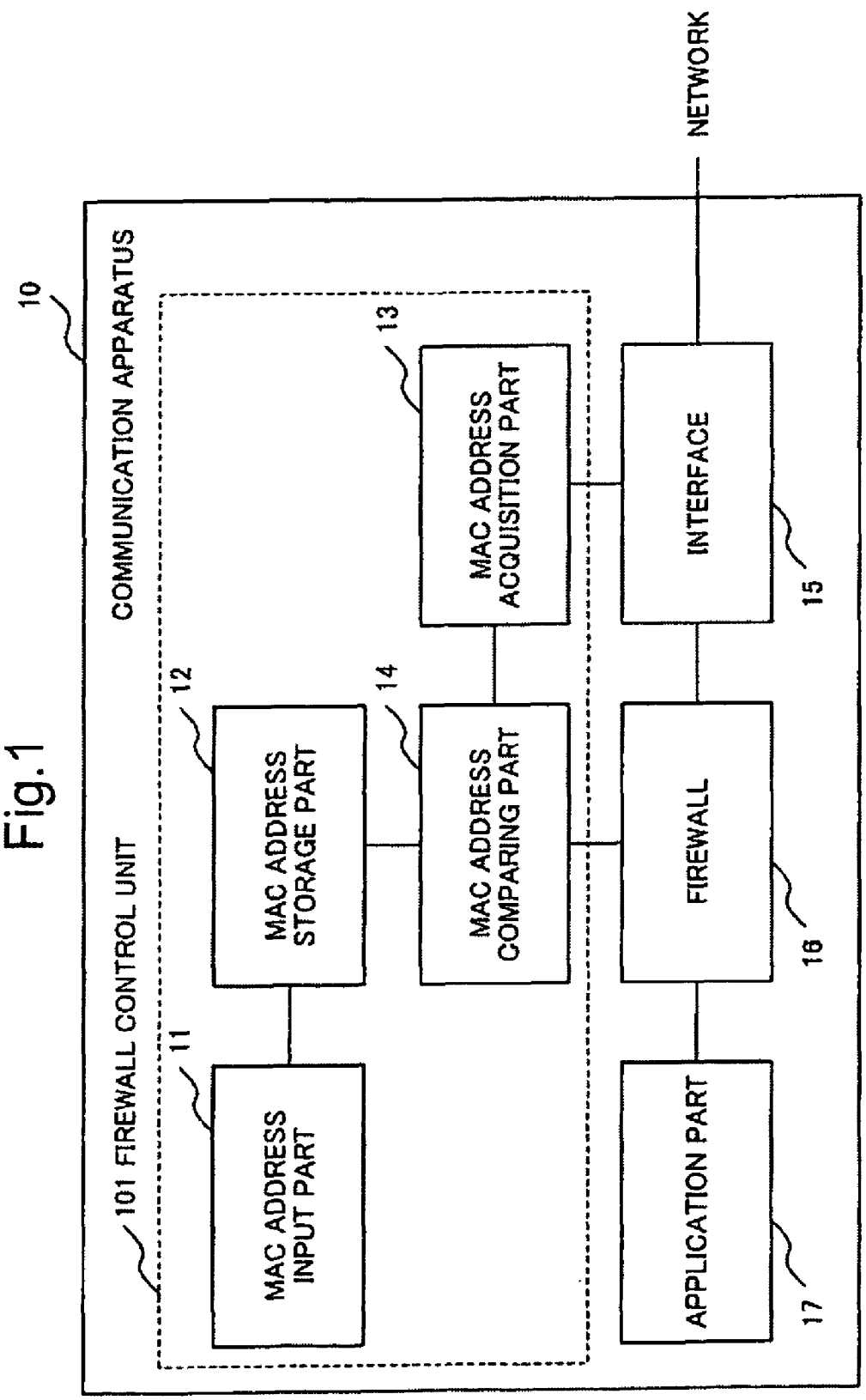
FIG. 1 is a block diagram showing an exemplary configuration of a communication apparatus of a first exemplary embodiment.

Referring to FIG. 1, a communication apparatus 10 of this exemplary embodiment includes a firewall control unit 101, an interface 15, a firewall 16 and an application part 17. The firewall control unit 101 of this exemplary embodiment includes a MAC address input part 11, a MAC address storage part 12, a MAC address acquisition part 13 and a MAC address comparing part 14.

The communication apparatus 10 has a firewall function and is used for a VPN (Virtual Private Network) appliance. The firewall function of the communication apparatus 10 is realized by the firewall 16, and it is controlled by the firewall control unit 101. A network adapter such as an NIC (Network Interface Card) may also be applicable for the communication apparatus 10. For example, a semiconductor integrated circuit (IC) on the communication interface (I/F) may also be applicable for the communication apparatus 10.

The MAC address input part 11 inputs, based on administrator's input operation, a MAC address of first default gateway which is provided for an intranet in which the communication apparatus 10 is supposed to be used. That is, the intranet is a home network of the communication apparatus 10 and the first default gateway is used by the communication apparatus 10 when the communication apparatus 10 connected in the intranet communicates with outside of the intranet. That is, the MAC address input part 11 sets the MAC address of the first default gateway to the communication apparatus 10. The MAC address storage part 12 stores the MAC address of the first default gateway inputted from the MAC address input part 11. The MAC address acquisition part 13 acquires a MAC address of second default gateway, which is provided in a network in which the communication apparatus is currently being connected, via the interface 15 based on an IP address obtained as a default gateway of the network. The second default gateway is accessed by the communication apparatus 10 when the communication apparatus having moved to another network tries to communicate with outside of the network. Further, the MAC address acquisition part 13 may include the interface 15. The MAC address comparing part 14 compares the MAC address of the first default gateway stored in the MAC address storage part 12 and the MAC address of the second default gateway acquired by the MAC address acquisition part 13, and discriminates whether the communication apparatus 10 is connected in the intranet or not. The MAC address comparing part 14 controls validity of the firewall 16 according to the discrimination result. When the firewall 16 is disabled, the interface 15 allows the communication apparatus 10 to connect to the network currently being connected (it should be the intranet). When it is enabled, the firewall 16 functions as a firewall of the communication apparatus 10, and prohibits the communication apparatus 10 to connect to the network currently being connected (it should be an outside network). The application part 17 provides functions to access and communicate with outside of the communication apparatus 10 via the interface 15.

As an example of the MAC address input part 11, an input device such as a keyboard, buttons, a touch panel, a tablet, a mouse and an on-screen keypad is considered. As the MAC address input part 11, only an input interface for receiving input data from outside the communication apparatus may also be applicable.

As an example of the MAC address storage part 12, a physical memory media or a storage device, a memory area such as a butter is considered.

As an example of the MAC address acquisition part 13, the MAC address comparing part 14, the firewall 16 and the application part 17, a processing device such as CPU (Central Processing Unit) and a microprocessor is considered, or a semiconductor integrated circuit (IC) which functions as the MAC address acquisition part 13, the MAC address comparing part 14, the firewall 16 and the application part 17 is also considered. Or, software programs which make the communication apparatus function as the MAC address acquisition part 13, the MAC address comparing part 14, the firewall 16 and the application part 17 is also applicable for the MAC address acquisition part 13, the MAC address comparing part 14, the firewall 16 and the application part 17.

As an example of the interface 15, a network adapter such as an NIC (Network Interface Card), an antenna and other communication interfaces or the like are considered. It does not matter for the type of network whether it is a wired network or a wireless network. As an example of the network, the internet, intranet, a LAN (Local Area Network), a wireless LAN, ADSL (Asymmetric Digital Subscriber Line), a CATV (cable TV) circuit, an optic fiber circuit, a leased line, an analogue telephone line, IrDA (Infrared Data Association), Bluetooth (registered trademark), WiMAX, 3G (third generation) mobile phone and a serial communication or the like are considered.

However, actually, it is not limited to these examples.

Further, a MAC address is a specific ID number allocated to each network card. The MAC address is indicated by combination of two numbers, one number is managed and allocated by IEEE (Institute of Electrical and Electronic Engineers) and is specific to each manufacturer and the other number is allocated by each manufacturer individually. The MAC address is a physical address which has close relation to hardware such as a network card, and it is usually impossible to change it by setting on the system. Therefore, the MAC address is invariable.

On the other hand, an IP address is an identification number assigned for each communication apparatus connected to a network. The IP address can generally be changed by setting on the system. For example, when an IP address is assigned dynamically to a communication apparatus using a DHCP (Dynamic Host Configuration Protocol) server, a different IP address is assigned each time the communication apparatus connects with the network.

Figure 2:
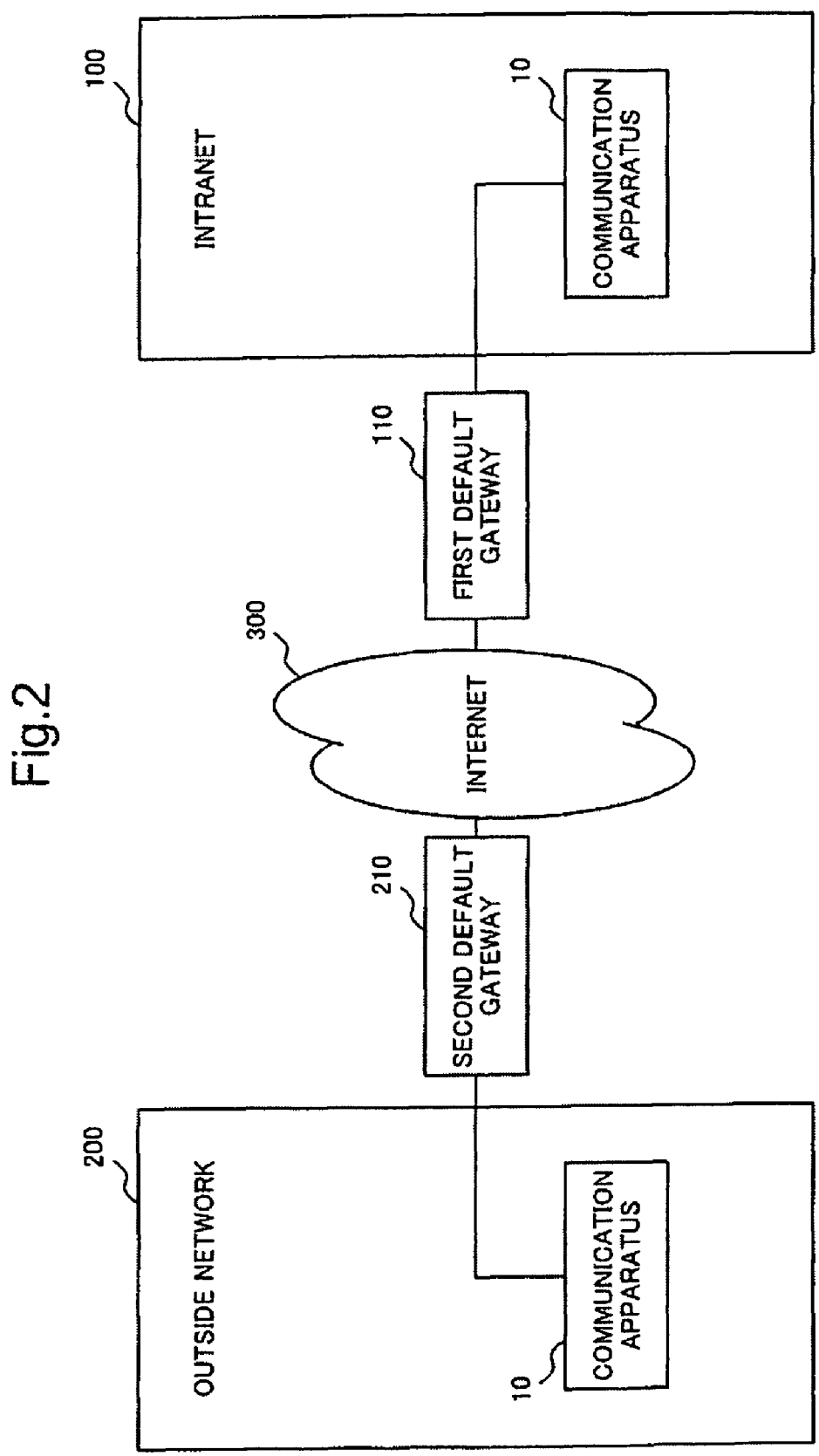
FIG. 2 is a system configuration diagram of the first exemplary embodiment.

As shown in FIG. 2, the communication apparatus 10 of this exemplary embodiment can be connected to both of the intranet 100 and an outside network 200 which is other than the intranet 100. The intranet 100 is connected to the internet 300 via the first default gateway 110. The outside network 200 is connected to the internet 300 via the second default gateway 210.

Figure 3:
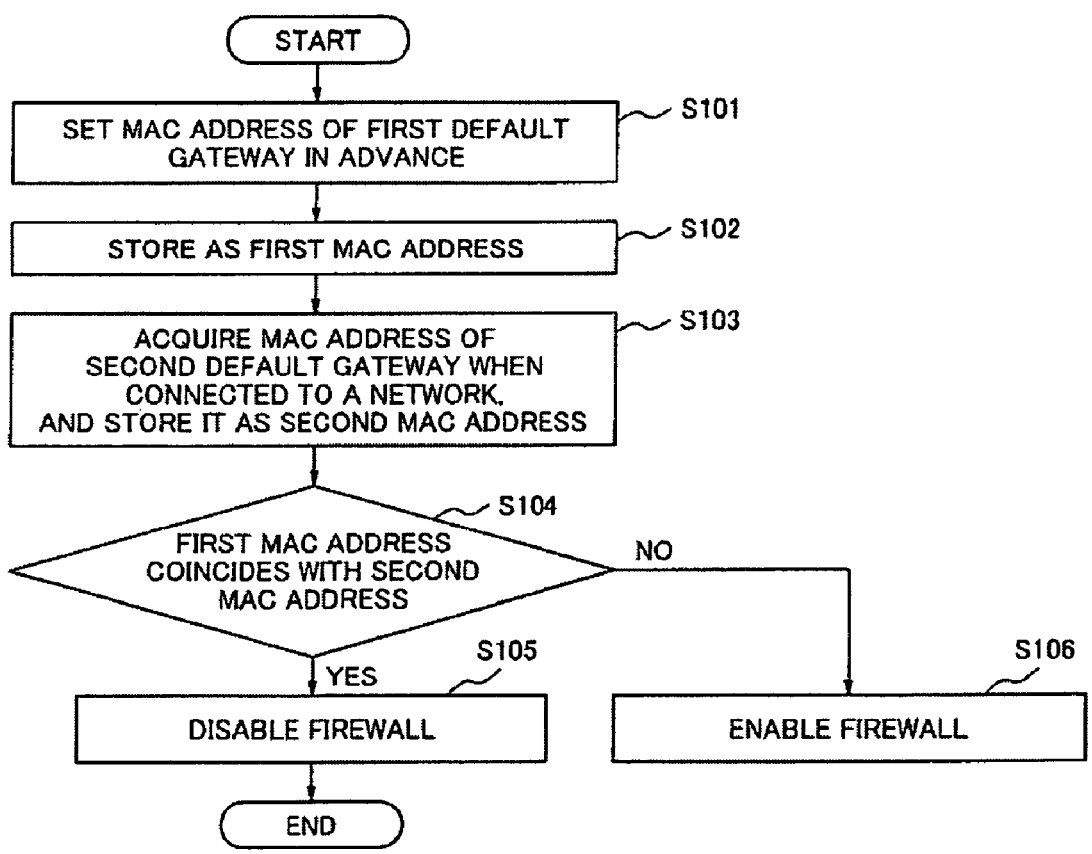
FIG. 3 is a flowchart showing an operation in the first exemplary embodiment.

Operation in this exemplary embodiment will be described with reference to FIG. 3.

(1) Step S101

An administrator checks in advance a MAC address of the first default gateway 110 which is used by the communication apparatus 10 when the communication apparatus 10 is used in the intranet 100, and the administrator inputs the MAC address of the first default gateway 110 to the communication apparatus 10 from the MAC address input part 11.

That is, the communication apparatus 10 obtains the MAC address of the first default gateway 110 of the intranet 100 in advance based on the administrator's input operation from the MAC address input part 11.

(2) Step S102

The MAC address storage part 12 stores the above-mentioned MAC address which has received from the MAC address input part 11. For example, the MAC address storage part 12 receives notification about the MAC address of the first default gateway 110 from the MAC address input part 11, and stores the notified MAC address. Here, the MAC address of the first default gateway 110 stored in the MAC address storage part 12 is called a first MAC address. The MAC address storage part 12 provides the first MAC address for the MAC address comparing part 14.

(3) Step S103

When the communication apparatus 10 is connected to any network and the interface 15 is enabled, the MAC address acquisition part 13 acquires a MAC address of the second default gateway of the connected network via the interface 15 based on an IP address obtained as a default gateway of the network, and stores the acquired MAC address. Further, the interface 15 may be arranged so as to be enabled automatically when the communication apparatus 10 is connected to any network. Here, whenever the interface 15 is enabled, the MAC address acquisition part 13 should always newly acquire a MAC address of the second default gateway of the connected network based on the IP address obtained as a default gateway of the network. For example, the MAC address acquisition part 13 acquires a MAC address by using ARP (Address Resolution Protocol). In this case, the MAC address acquisition part 13 accesses (sends an ARP request) the second default gateway of the connected network based on the IP address, and acquires the MAC address of the connected network default gateway (second default gateway). Here, the MAC address of the second default gateway acquired by the MAC address acquisition part 13 is called a second MAC address. The MAC address acquisition part 13 provides the second MAC address for the MAC address comparing part 14. Further, the MAC address storage part 12 may actually be arrange so as to store both of the first MAC address and the second MAC address together and to provide them for MAC address comparing part 14. When a MAC address of the second default gateway of the connected network cannot be acquired via the interface 15, the MAC address acquisition part 13 leaves the second MAC address blank.

(4) Step S104

The MAC address comparing part 14 compares the first MAC address and the second MAC address, and based on the comparison result, it discriminates whether the communication apparatus 10 is connected to the intranet 100 or not. When the MAC address comparing part 14 detects that the first MAC address and the second MAC address are identical, it judges that the communication apparatus 10 is currently being connected to the intranet 100. When the MAC address comparing part 14 detects that the first MAC address and the second MAC address are not identical, it judges that the communication apparatus 10 is connected to the outside network 200 which is other than the intranet 100. The MAC address comparing part 14 controls validity of the firewall 16 according to the discrimination result as above.

(5) Step S105

When the MAC address comparing part 14 judges that the communication apparatus 10 is being connected to the intranet 100, the MAC address comparing part 14 disables the firewall 16 and permits all communication between the application part 17 and the intranet 100. In this case, the communication apparatus 10 can perform communication with the internet 300 through the first default gateway 110 of the intranet 100.

(6) Step S106

When the MAC address comparing part 14 judges that the communication apparatus 10 is connected to the outside network 200, the MAC address comparing part 14 enables the firewall 16 and prohibits any communication between the application part 17 and the outside network 200.

Figure 4:
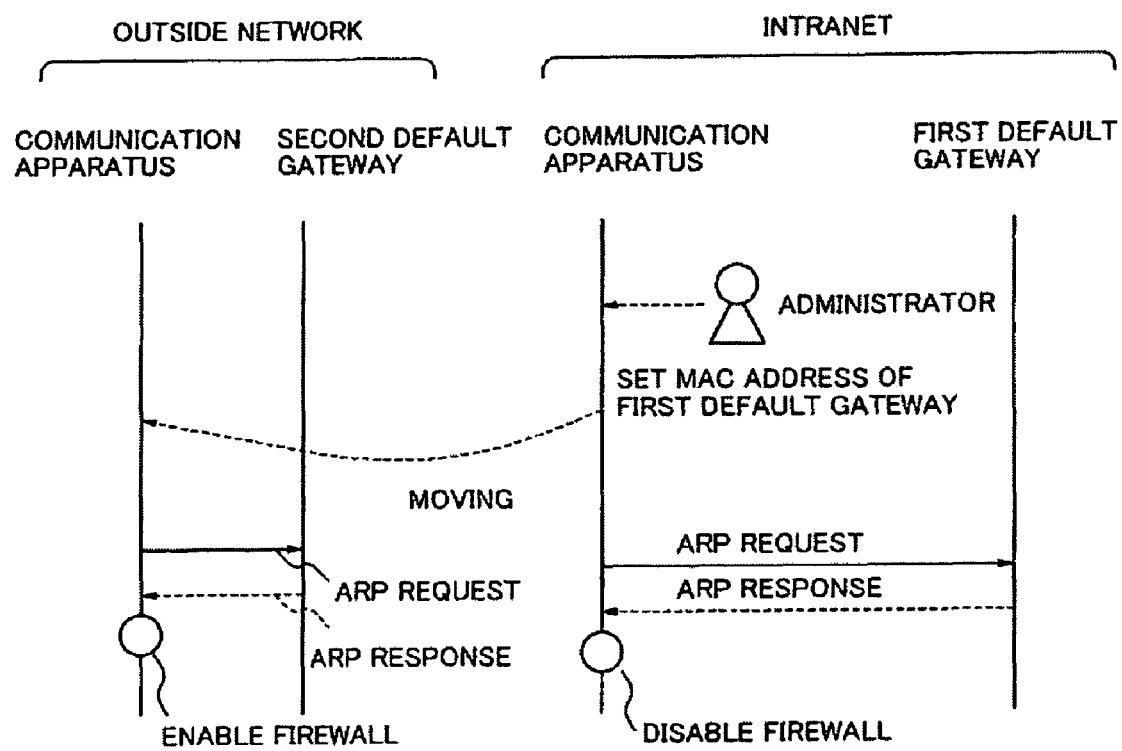
FIG. 4 is a sequence diagram showing a firewall control by using a MAC address matching method according to the first exemplary embodiment.

An exemplary embodiment of firewall control by using the MAC address matching method will be described with reference to FIG. 4.

First, when the communication apparatus 10 is connected to the intranet 100, the administrator sets a MAC address of the first default gateway 110 of the intranet 100 to the communication apparatus 10 in advance. After that, when the communication apparatus 10 is used in the intranet 100, the communication apparatus 10 sends an ARP request to the first default gateway 110, which is supposed to be a second default gateway even if the actual default gateway concerned is the first default gateway, based on the IP address obtained as a default gateway of the network. Then, the communication apparatus 10 obtains the MAC address of the first default gateway 110 (as the second default gateway) contained in an ARP response sent back from the first default gateway 110.

In this case, as the MAC address set by the administrator (first MAC address) and the MAC address obtained by the ARP response (second MAC address) are identical, the communication apparatus 10 judges that it is connected to the intranet 100 as the result of comparison of these two MAC addresses and disables the firewall 16. Then, the communication apparatus 10 can perform communication with the internet 300 through the first default gateway 110 of the intranet 100.

On the other hand, when the communication apparatus 10 is moved and used in the outside network 200, the communication apparatus 10 sends the ARP request to the second default gateway 210 of the outside network 200 based on the IP address obtained as a default gateway of the network. In this case, as the MAC address set by the administrator (first MAC address) and the MAC address obtained by the ARP response (second MAC address) are not identical, the communication apparatus 10 judges that it is connected to the network which is other than the intranet 100 and enables the firewall 16 for prohibiting communication with outside of the communication apparatus 10. Further, if a MAC address cannot be obtained by the ARP response, the communication apparatus 10 also judges that it is connected to the network which is other than the intranet 100 and enables the firewall 16.

As a result, the firewall function provided in the communication apparatus 10 can be controlled properly by the firewall control unit 101 included in the communication apparatus 10 because the firewall control unit 101 can correctly judge whether it is used in the intranet or whether it is used in the other network, and it is possible to maintain the strict security of the communication apparatus 10 used at outside of the intranet. In other words, easy security management can be realized because the communication apparatus 10 itself controls validity of the firewall function automatically by judging the position where the communication apparatus 10 is being used.

A second exemplary embodiment will be described with reference to accompanying drawings below.

According to this exemplary embodiment, the communication apparatus 10 can perform automatic acquisition of a MAC address of the first default gateway provided for the intranet. For example, when a large number of communication apparatuses are used in the intranet, it is troublesome for the administrator to set the MAC address of the first default gateway to all communication apparatuses by manually. Therefore, this exemplary embodiment solves such a problem. Here, a MAC address automatic acquisition part 21 is provided in a firewall control unit 102 of the second exemplary embodiment instead of the MAC address input part 11 which is included in the firewall control unit 101 of the first exemplary embodiment.

Figure 5:
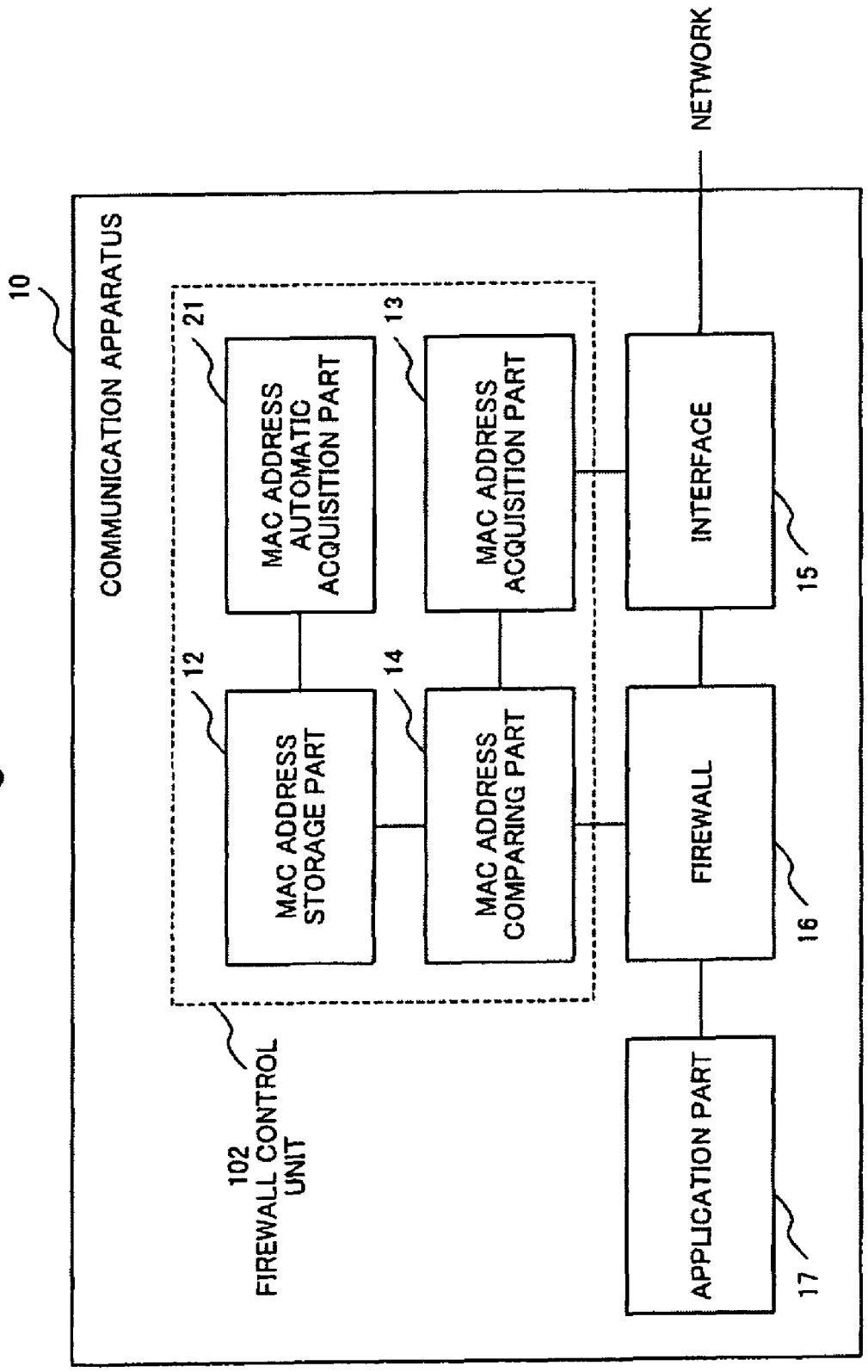
FIG. 5 is a block diagram showing an exemplary configuration of a communication apparatus of a second exemplary embodiment.

Referring to FIG. 5, the communication apparatus 10 of this exemplary embodiment includes the firewall control unit 102, the interface 15, the firewall 16 and the application part 17. The firewall control unit 102 of this exemplary embodiment includes the MAC address automatic acquisition part 21, the MAC address storage part 12, the MAC address acquisition part 13 and the MAC address comparing part 14. The MAC address storage part 12, the MAC address acquisition part 13, the MAC address comparing part 14, the interface 15, the firewall 16 and the application part 17 are the same as those of the first exemplary embodiment.

The communication apparatus 10 has a firewall function and is used for a VPN (Virtual Private Network) appliance. The firewall function of the communication apparatus 10 is realized by the firewall 16, and it is controlled by the firewall control unit 102. Here, the communication apparatus 10 is a client PC in CSS (Client Server System). As the communication apparatus 10, a network adapter such as an NIC (Network Interface Card) provided into the client PC is also applicable. For example, the communication apparatus 10 may be a semiconductor integrated circuit (IC) on the communication interface (I/F) board.

The MAC address automatic acquisition part 21 acquires a MAC address of the first default gateway automatically when the communication apparatus 10 is connected to the intranet. That is, the MAC address automatic acquisition part 21 acquires the MAC address of the first default gateway provided for the intranet and sets it to the communication apparatus 10. Here, when the communication apparatus 10 is activated, access from the communication apparatus 10 to a server 20 provided in the intranet 100 is performed. Then, the MAC address automatic acquisition part 21 automatically acquires information on the MAC address of the first default gateway 110 which is held in the server 20. At that time, it is supposed that the MAC address automatic acquisition part 21 has information such as a local address for specifying location of at least one server 20 provided in the intranet 100.

As an example of the MAC address automatic acquisition part 21, a processing device such as CPU (Central Processing Unit) and a microprocessor is considered, or a semiconductor integrated circuit (IC) which functions as the MAC address automatic acquisition part 21 is also considered. Or, the MAC address automatic acquisition part 21 may be software programs which makes the communication apparatus 10 function as the MAC address automatic acquisition part 21.

Figure 6:
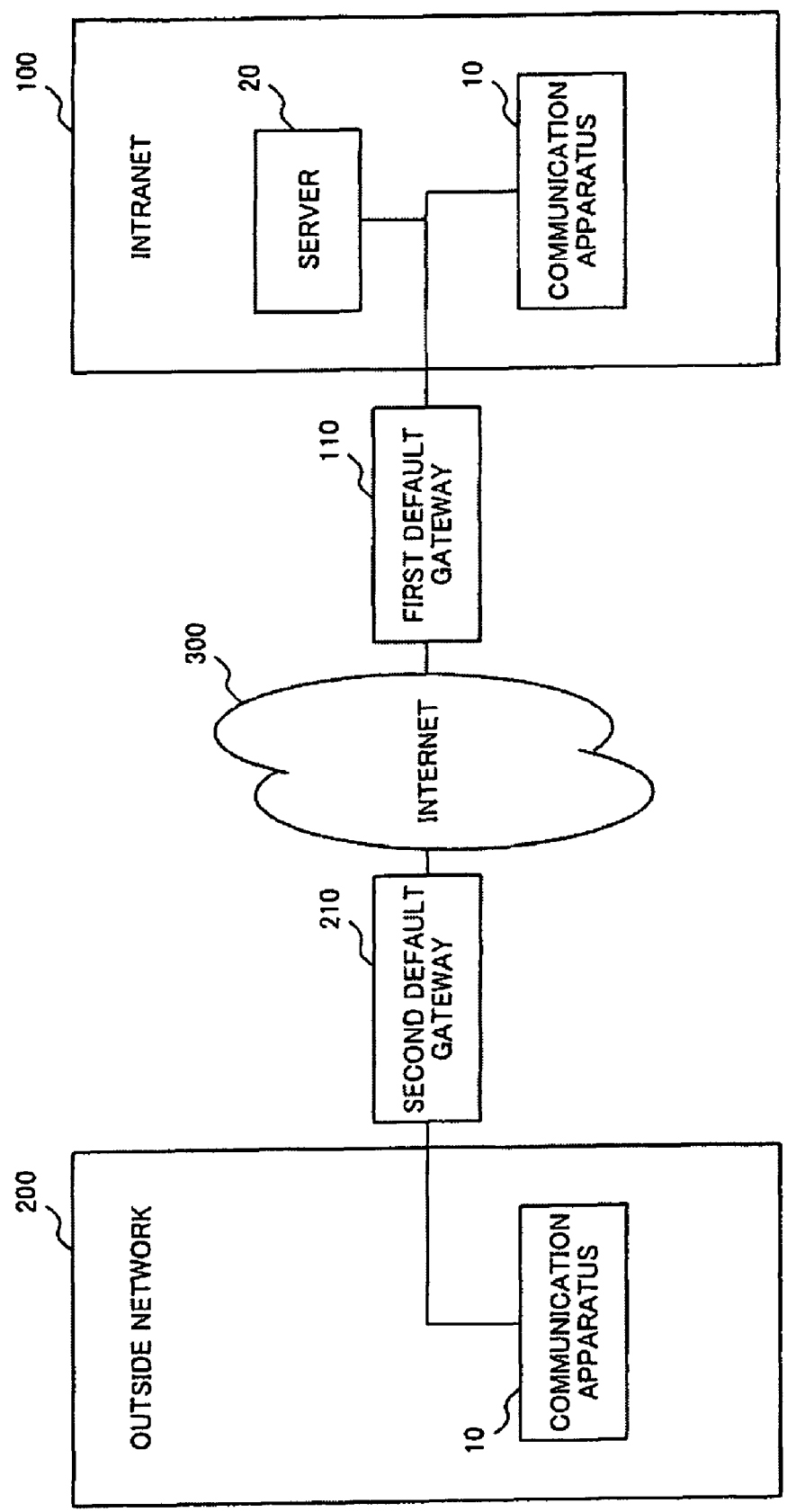
FIG. 6 is a system configuration diagram of the second exemplary embodiment.

As shown in FIG. 6, the communication apparatus 10 of this exemplary embodiment can be used in both of the intranet 100 and the outside network 200 which is other than the intranet 100. The server 20 is installed in the intranet 100. The communication apparatus 10 and the server 20 can communicate in the intranet 100. The intranet 100 is connected to the internet 300 via the first default gateway 110. The outside network 200 is connected to the internet 300 via the second default gateway 210.

Figure 7:
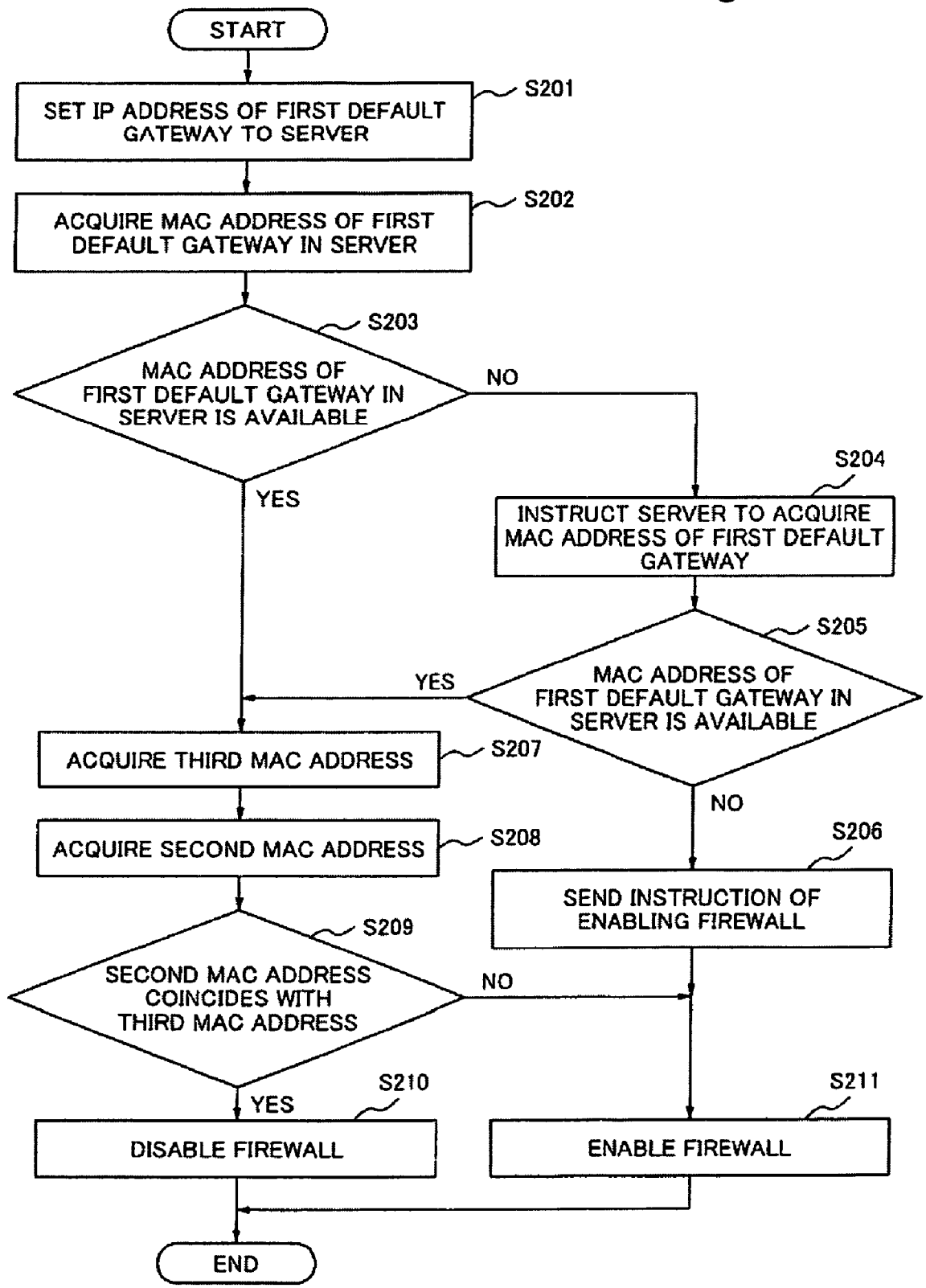
FIG. 7 is a flowchart showing an operation in the second exemplary embodiment.

Operation in this exemplary embodiment will be described with reference to FIG. 7.

(1) Step S201

The administrator sets an IP address of the first default gateway 110 provided for the intranet 100 to the server 20.

(2) Step S202

When the IP address of the first default gateway 110 is set to the server 20, the server 20 acquires a MAC address of the first default gateway 110 using a method such as ARP. Further, the server 20 may periodically acquire the MAC address of the first default gateway 110.

(3) Step S203

When the communication apparatus 10 is connected to the intranet 100, the MAC address automatic acquisition part 21 sends an information acquisition request for acquiring information on the network from the server 20 and receives an information acquisition response from the server 20. Then, the MAC address automatic acquisition part 21 determines whether a MAC address of the first default gateway 110 is included in the acquired information from the server 20. At that time, it may be so configured that the MAC address automatic acquisition part 21 tries to make a connection to the server 2U when the communication apparatus 10 is connected to any network, and the MAC address automatic acquisition part 21 judges that the communication apparatus 10 is being connected to the intranet 100 if the MAC address automatic acquisition part 21 succeeds in connecting to the server 20.

(4) Step S204

When a MAC address of the first default gateway 110 is not included in the acquired information from the server 20, the MAC address automatic acquisition part 21 sends a MAC address acquisition request for requesting the server 20 to obtain a MAC address of the first default gateway 110, and receives a MAC address acquisition response from the server 20 as a response.

(5) Step S205

The MAC address automatic acquisition part 21 determines whether a MAC address of the first default gateway 110 can be obtained from the server 20 or not with referring to the MAC address acquisition response from the server 20.

(6) Step S206

When the MAC address automatic acquisition part 21 has determined that a MAC address of the first default gateway 110 cannot be obtained from the server 20 as the response from the server 20, the MAC address automatic acquisition part 21 directs the MAC address comparing part 14 to enable the firewall 16 to prohibit communication with outside of the communication apparatus 10.

(7) Step S207

When it is confirmed that a MAC address of the first default gateway 110 has been obtained from the server 20, the MAC address automatic acquisition part 21 obtains the MAC address of the first default gateway 110. The MAC address obtained by the MAC address automatic acquisition part 21 is called a third MAC address. The third MAC address corresponds to the first MAC address in the first exemplary embodiment, i.e., it is the MAC address of the first default gateway.

At that time, the MAC address storage part 12 may store the third MAC address. Further, once the third MAC address has been obtained and stored in the MAC address storage part 12, it is not necessary for the MAC address automatic acquisition part 21 to perform processing of acquiring the third MAC address. However, actually, the MAC address automatic acquisition part 21 may acquire the third MAC address whenever the communication apparatus 10 is connected to any network.

(8) Step S208

When the interface 15 is enabled and the communication apparatus is connected to any network, the MAC address acquisition part 13 acquires a MAC address of the second default gateway of the connected network via the interface 15 based on an IP address obtained as a default gateway of the network, and stores the acquired MAC address. Here, the second default gateway will be the first default gateway 110 or the second default gateway 210 in FIG. 6. The MAC address acquired by the MAC address acquisition part 13 is the second MAC address. At that time, the MAC address storage part 12 may store the second MAC address. When a MAC address of the second default gateway of the connected network cannot be obtained via the interface 15, the MAC address acquisition part 13 leaves the second MAC address blank.

(9) Step S209

When the second MAC address and the third MAC address become available for comparison, the MAC address comparing part 14 compares the second MAC address and the third MAC address.

(10) Step S210

Because the second MAC address and the third MAC address are identical when the communication apparatus 10 is used in the intranet 100, the MAC address comparing part 14 disables the firewall 16 in such a case, and permits all communication between the application part 17 and the intranet 100, including communication with the internet 300 through the first default gateway 110.

(11) Step S211

Because the second MAC address and the third MAC address are not identical when the communication apparatus 10 is used in the outside network 200, the MAC address comparing part 14 enables the firewall 16 in such a case, and prohibits any communication between the application part 17 and outside of the communication apparatus 10. Further, when both of the second MAC address and the third MAC address are not available for comparison, the MAC address comparing part 14 judges that the communication apparatus is used in the outside network 200, and it also enables the firewall 16.

Figure 8:
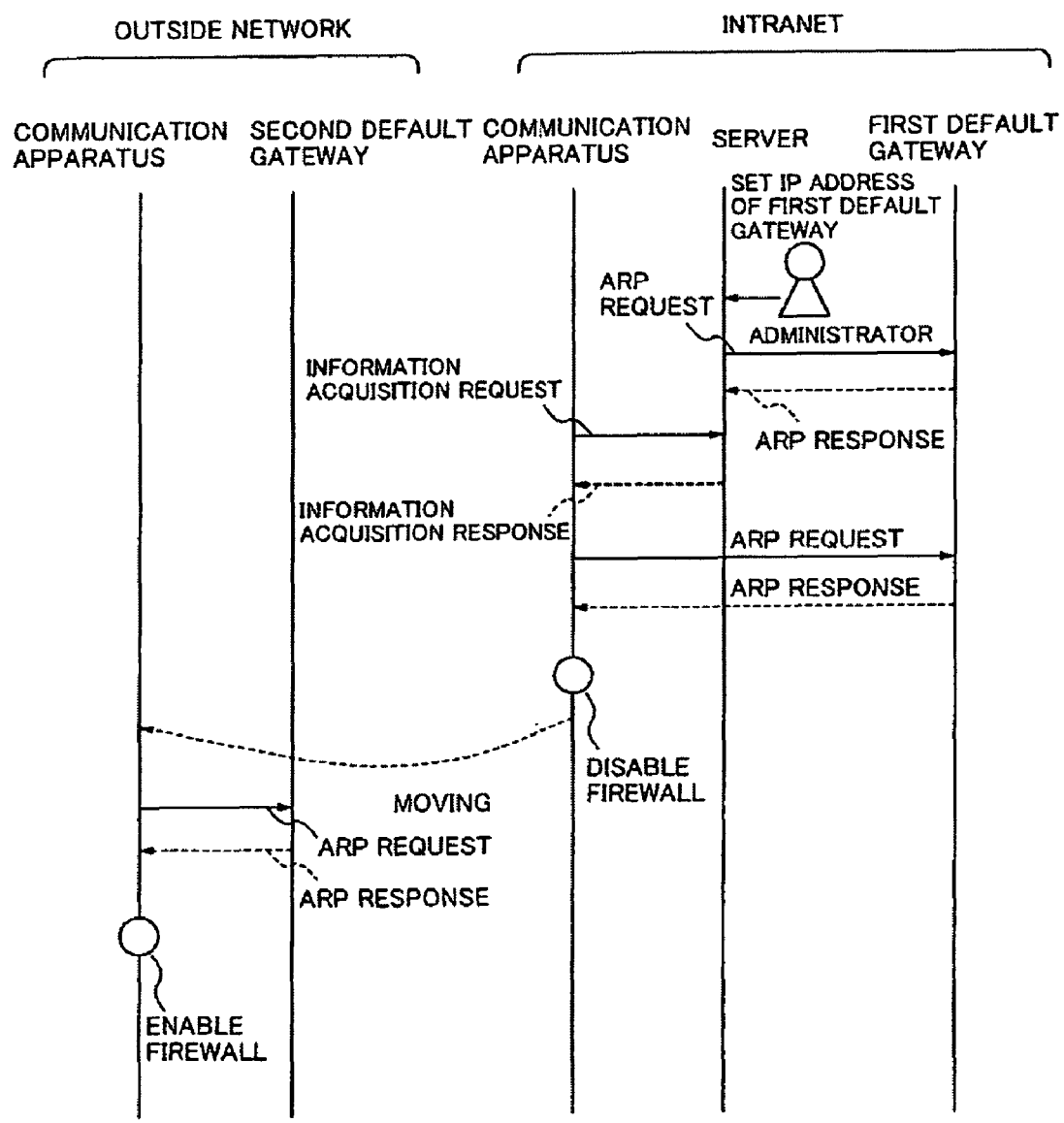
FIG. 8 is a sequence diagram showing a firewall control by using a MAC address matching method according to the second exemplary embodiment.

The firewall control by using the MAC address matching method in this exemplary embodiment will be described with reference to FIG. 8.

First, the administrator sets in advance an IP address of the first default gateway 110 provided for the intranet 100 to the server 20, which is installed in the intranet 100. The server 20 performs an ARP request to the first default gateway 110 based on the IP address of the first default gateway 110 set by the administrator, and receives the MAC address from the first default gateway 110 by an ARP response. When the communication apparatus 10 is connected to the intranet 100, the communication apparatus 10 performs an information acquisition request to the server 20 and receives the MAC address of the first default gateway 110 from the server 20 as the information acquisition response or the MAC address acquisition response (third MAC address). Then, the communication apparatus 10 performs an ARP request to the first default gateway 110, which is supposed be a second default gateway here even if the actual default gateway concerned is the first default gateway, based on the IP address obtained as a default gateway of the network, and receives the MAC address from the first default gateway 110 (as the second default gateway) by an ARP response (second MAC address). When the MAC address received from the server 20 (third MAC address) and the MAC address received from the first default gateway 110 by the ARP response (second MAC address) are identical, the communication apparatus 10 judges that it is being used in the intranet 100 and disables the firewall 16.

After that, when the communication apparatus 10 is moved and connected to the outside network 200 which is other than the intranet 100, the communication apparatus 10 sends the ARP request to the second default gateway 210 of the outside network 200 based on an IP address obtained as a default gateway of the network. In this case, as the MAC address received from the server 20 (third MAC address) and the MAC address obtained by the ARP response (second MAC address) are not identical, the communication apparatus 10 judges that it is connected to the outside network which is other than the intranet 100 and enables the firewall 16. Further, if the communication apparatus does not hold the MAC address received from the server 20 (third MAC address), or if the second MAC address cannot be obtained by the ARP response from the second default gateway 210 of the other network 200, the communication apparatus 10 also judges that it is connected to the outside network which is other than the intranet 100 and enables the firewall 16.

Further, in this exemplary embodiment, the server 20 installed in the intranet 100 may memorize the MAC address of the first default gateway 110 inputted by the administrator in advance. Actually, the sever 20 may be substituted by other communication apparatus which has already been connected and used in the intranet 100. For example, it is possible to use the communication apparatus, which has been confirmed by the first exemplary embodiment that it is connected to the intranet 100, as the server 20.

A third exemplary embodiment will be described with reference to accompanying drawings below.

According to this exemplary embodiment, the administrator sets plural number of MAC addresses for virtual first default gateways other than the actual first default gateway which is usually one. As the MAC address of the actual first default gateway can be automatically acquired by the communication apparatus as described in the second exemplary embodiment, the administrator sets to the communication apparatus any number of MAC addresses of virtual first default gateways which are used for providing plural number of segments in the intranet. Each virtual first default gateway works as the first default gateway of each segment, and if the communication apparatus holds such MAC addresses, the firewall function can be controlled even in the intranet depending on the segment in which the communication apparatus is used. That is, the firewall function of the communication apparatus is disabled in a certain segment for which the communication apparatus holds a MAC address corresponding to the virtual first default gateway of the certain segment, and the firewall function of the communication apparatus is enabled in another segment for which the communication apparatus does not hold a MAC address corresponding to the virtual first default gateway of the another segment. Therefore, it is possible to provide classified communication apparatuses to be used in different segment of the intranet.

Figure 9:
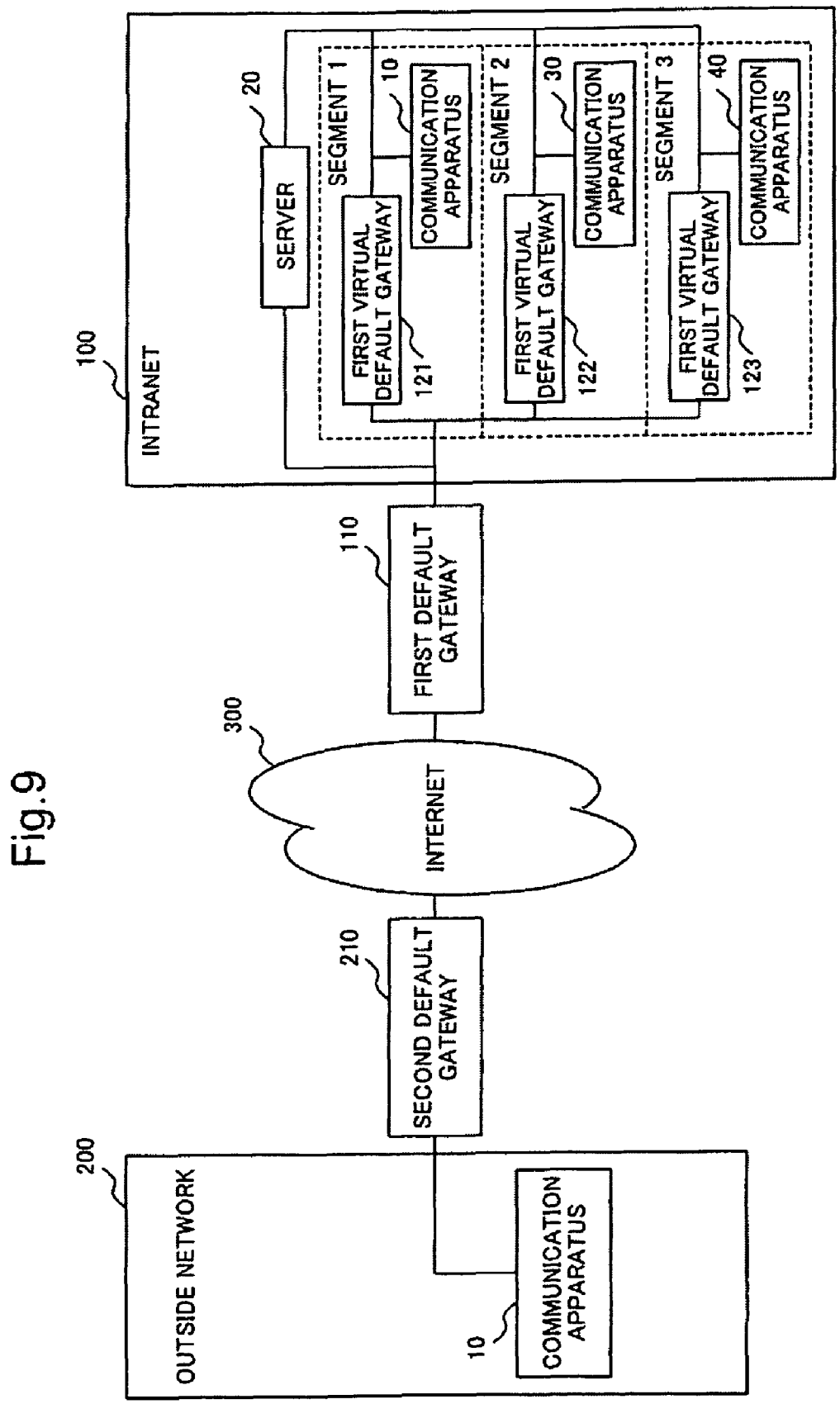
FIG. 9 is a system configuration diagram of a third exemplary embodiment.

FIG. 9 shows an example of system configuration diagram of the third exemplary embodiment, and the intranet 100 is divided into three segments 1-3. In each segment, a virtual first default gateway 121, 122 or 123 is provided. The server 20 holds a MAC address of the actual first default gateway 110, and each communication apparatus 10, 30 or 40 can obtain the MAC address of the actual first default gateway 110 automatically as described in the second exemplary embodiment. If the communication apparatus 10 has MAC addresses of all virtual first default gateways 121-123 set by the administrator, a user can make communication with outside of each segment by using the communication apparatus 10 in any segments 1-3 of the intranet 100. However, if the communication apparatus 30 or 40 has only a MAC address of the virtual first default gateway 122 or 123 respectively set by the administrator, a user can make communication with outside of the segment only when the communication apparatus 30 or 40 is used in the respective segment 2 or 3.

Figure 10:
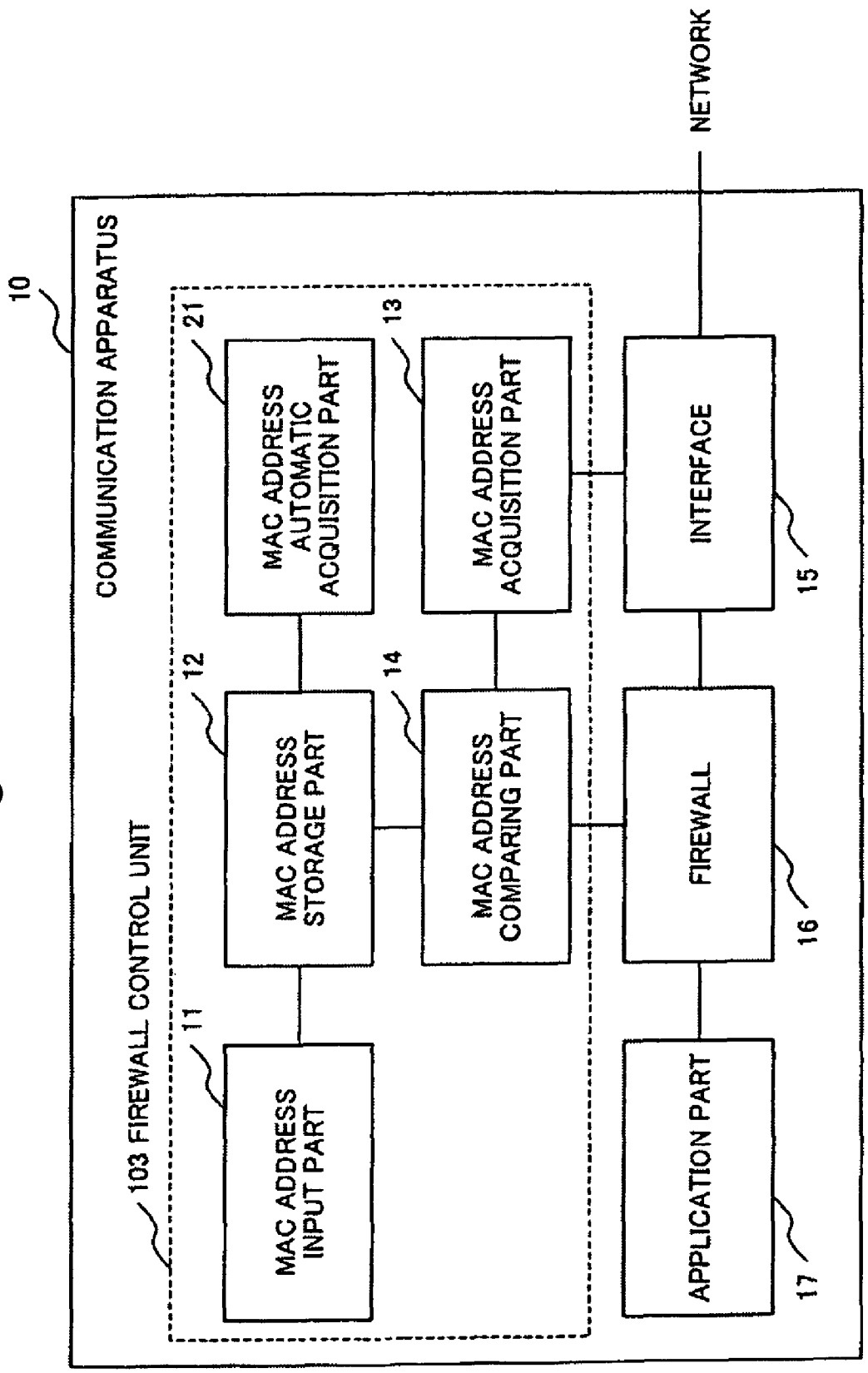
FIG. 10 is a block diagram showing an exemplary configuration of a communication apparatus of the third exemplary embodiment.

Referring to FIG. 10, the communication apparatus 10 of this exemplary embodiment includes a firewall control unit 103, the interface 15, the firewall 16 and the application part 17. The firewall control unit 103 of this exemplary embodiment includes the MAC address input part 11, the MAC address automatic acquisition part 21, the MAC address storage part 12, the MAC address acquisition part 13 and the MAC address comparing part 14. The firewall function of the communication apparatus 10 is realized by the firewall 16, and it is controlled by the firewall control unit 103. The MAC address input part 11, the MAC address automation acquisition part 21, the MAC address storage part 12, the MAC address acquisition part 13, the MAC address comparing part 14, the interface 15, the firewall 16 and the application part 17 are the same as those of the first and second exemplary embodiments.

Figure 11:
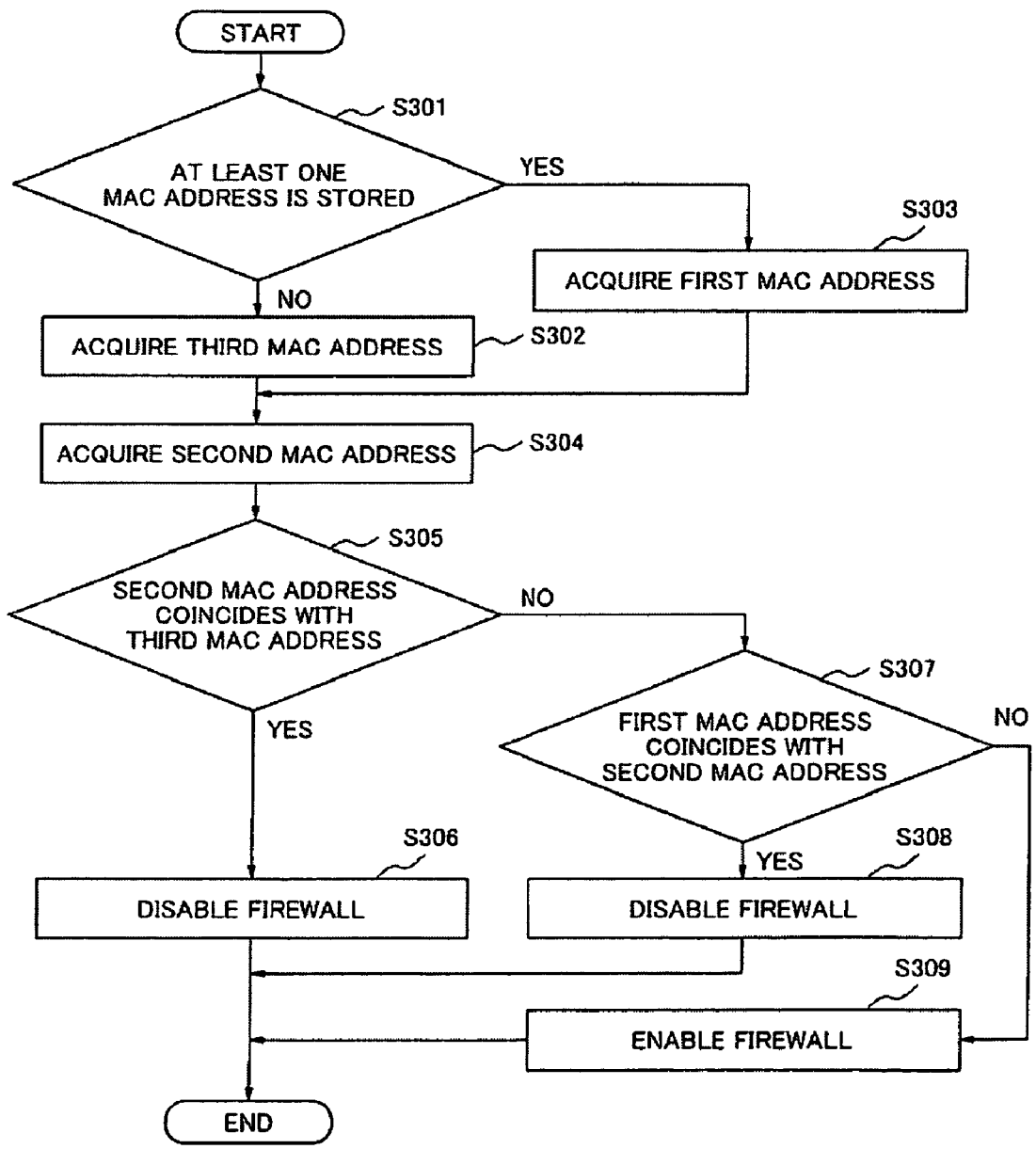
FIG. 11 is a flowchart showing an operation in the third exemplary embodiment.

Operation in this exemplary embodiment will be described with reference to FIG. 11.

(1) Step S301

The MAC address automatic acquisition part 21 refers to the MAC address storage part 12, and examines whether at least one MAC address is set or not.

(2) Step S302

When the MAC address is not set at all in the MAC address storage part 12, the MAC address automatic acquisition part 21 acquires the third MAC address from the server 20 provided in the intranet 100 when the communication apparatus 10 is connected to any segment 1-3 of the intranet 100. Then, the acquired third MAC address is stored in the MAC address storage part 12. The operation in detail for acquiring the third MAC address from the server 20 is the same operation as Steps S201-S207 of FIG. 7 of the second exemplary embodiment.

(3) Step S303

When at least one MAC address is set in the MAC address storage part 12, the MAC address automatic acquisition part 21 does not acquire the third MAC address from the server 20 in the intranet 100. At least one MAC address which has been set in the MAC address storage part 12 is the first MAC address acquired from the MAC address input part 11 based on the administrator's input operation, and this is the MAC address of the virtual first default gateway as described before. Further, it also may be so configured that the first MAC address is not stored in the MAC address storage part 12 until the third MAC address is stored in the MAC address storage part 12. In this case, the MAC address automatic acquisition part 21 always acquires the third MAC address from the server 20 and stores it in the MAC address storage part 12. When the MAC address storage part 12 has stored the third MAC address, the MAC address storage part 12 creates a MAC address list and then it confirms whether the first MAC address is held in the MAC address input part 11 based on the administrator's input operation. If the first MAC address is held in the MAC address input part 11, the MAC address storage part 12 obtains and stores the first MAC address, and the MAC address storage part 12 adds the first MAC address in the MAC address list. It may be plural number of MAC addresses as the first MAC address as described before. Further, the operation in detail for acquiring the first MAC address is the same as Step S101 and Step S102 of FIG. 3 of the first exemplary embodiment.

(4) Step S304

When the interface 15 is enabled and the communication apparatus is connected to any network, the MAC address acquisition part 13 acquires a MAC address of the second default gateway of the connected network via the interface 15 based on the IP address obtained as a default gateway of the network, and stores the acquired MAC address. Here, the second default gateway will be the virtual first default gateway 121, 122 or 123 provided in the intranet 100 or the second default gateway 210 in FIG. 9. The MAC address acquired by the MAC address acquisition part 13 is the second MAC address. At that time, the MAC address storage part 12 may store the second MAC address. When a MAC address of the second default gateway of the connected network cannot be obtained via the interface 15, the MAC address acquisition part 13 leaves the second MAC address blank.

(5) Step S305

When the second MAC address and the third MAC address are available for comparison, the MAC address comparing part 14 compares the second MAC address and the third MAC address.

(6) Step S306

When the second MAC address and the third MAC address are identical, the MAC address comparing part 14 judges that the communication apparatus is connected and used in the intranet 100 and it disables the firewall 16. This case is applied when the communication apparatus 10 is used in the intranet in which none of the virtual first default gateway is provided, i.e., the intranet is not divided into any segment.

(7) Step S307

When the second MAC address and the third MAC address are not identical, the MAC address comparing part 14 compares the first MAC address and the second MAC address, because the second MAC address could be a MAC address of the virtual first default gateway provided in a divided intranet.

(8) Step S308

When the first MAC address and the second MAC address are identical, the MAC address comparing part 14 judges that the communication apparatus is connected and used in one of segments in the intranet 100 in which the communication apparatus 10 is allowed to use, and the MAC address comparing part 14 disables the firewall 16.

(9) Step S309

When the first MAC address and the second MAC address are not identical, the MAC address comparing part 14 judges that the communication apparatus is connected and used in one of segments of the intranet in which the communication apparatus 10 is not allowed to use or the communication apparatus is connected and used in the outside network 200 which is other than the intranet, and the MAC address comparing part 14 enables the firewall 16. Further, when both of the first MAC address and the second MAC address are not available for comparison, the MAC address comparing part 14 also judges that the communication apparatus is connected and used in the outside network 200, and it enables the firewall 16.

A fourth exemplary embodiment will be described below.

According to this exemplary embodiment, the function of periodically updating the MAC address of the first default gateway is provided. Usually, a certain unique IP address is allocated to a default gateway and it is not changed. However, there is a possibility that a MAC address of default gateway should be changed in a case of replacing the hardware of the default gateway due to malfunction being occurred or some other reason. If the MAC address of the first default gateway stored in the communication apparatus is not changed even in such a case, it may be judged that the communication apparatus is used in an outside network of the intranet even if the communication apparatus is used in the intranet. As the result, the firewall function is enabled in the communication apparatus. Accordingly, it is necessary for the server 20 to acquire a MAC address of the first default gateway periodically for updating the stored MAC address in the server 20, and also it is necessary for the communication apparatus 10 to acquire the MAC address of the first default gateway from the server 20 periodically for updating the stored MAC address in the communication apparatus 10. Then, the above-mentioned erroneous operation can be prevented.

Configuration of the communication apparatus 10 of this exemplary embodiment is the same as that of the second exemplary embodiment. In this exemplary embodiment, the MAC address automatic acquisition part 21 acquires a MAC address of the first default gateway periodically and updates the MAC address of the first default gateway stored in the MAC address storage part 12 based on the acquired MAC address. The MAC address acquired by the MAC address automatic acquisition part 21 is the third MAC address. Also, in this exemplary embodiment, it may be configured that the server 20 periodically acquires a MAC address of the first default gateway independent of a periodical MAC address acquisition operation by the MAC address automatic acquisition part 21, or the server 20 acquires a MAC address of default gateway in line with the periodical MAC address acquisition operation by the MAC address automatic acquisition part 21. In the latter case, the MAC address automatic acquisition part 21 may instruct the server 20 to acquire a MAC address of the first default gateway when the MAC address automatic acquisition part 21 sends a periodical information acquisition request to the server 20. Further, the cycle for acquiring the third MAC address by the MAC address automatic acquisition part 21 may be arbitrary set. For example, the MAC address automatic acquisition part 21 acquires the third MAC address in the predetermined time (such as every day 12:00) or the predetermined interval (such as every 2 hours) and updates the third MAC address stored in the MAC address storage part 12 in this cycle.

A fifth exemplary embodiment will be described below.

According to this exemplary embodiment, an operation which combines the MAC address matching method with the IP address matching method is performed. For example, by combining the MAC address matching method with the IP address matching method, it can be applicable to a VRRP (Virtual Router Redundancy Protocol) environment. In the VRRP environment, the specification defines that a MAC address to be allocated as a virtual MAC address has VRRPID (usual 1 origin) and a specific prefix. If the VRRP environment is being applied in both of the intranet and the outside network, there is a high possibility of using the same MAC address in both of the networks. Therefore, it would have been misjudged that the communication apparatus is used in the intranet even if the communication apparatus is connected to the outside network. As the result, the firewall function is not enabled, and the security function of the communication apparatus may be deteriorated. In order to evade such circumstances, the determining method by using the IP address matching is introduced together with the determining method by using the MAC address matching, and it can surely judge that the communication apparatus is used in the outside network which is other than the intranet if the IP address does not match each other even if the MAC addresses are identical.

Further, VRRP is a protocol for multiplexing routers. Under the VRRP environment, a plurality of routers belongs to one group and one of them usually performs communications. Then, when the router has malfunctioned, other router belonging to the same group automatically takes over the position and handles communications. VRRPID is the ID number for identifying a group under the VRRP environment.

Each exemplary embodiment as described above can be performed with combining any of them.

Thus, the communication apparatus according to the exemplary embodiments as described above compares the MAC address of the second default gateway of the network in which the communication apparatus is currently being connected and the MAC address of the first default gateway of the specific local network which has registered beforehand. If both of the MAC addresses are identical, it determines that the communication apparatus is connected to the specific local network, and the communication apparatus disables the firewall function for allowing communication to outside of the communication apparatus. In this case, the communication apparatus can communicate with the internet through the specific local network. It both of the MAC addresses are not identical, it judges that the communication apparatus is connected to an outside network of the specific local network, and the communication apparatus enables the firewall function for prohibiting communication to outside of the communication apparatus. In this case, the communication apparatus cannot communicate with the internet.

The present invention provides a control system for controlling validity of the firewall function of the communication apparatus for a VPN (Virtual Private Network) appliance correctly by judging the position of the communication apparatus, whether the communication apparatus is connected to a specific local network such as the intranet or connected to other networks, based on a MAC address of the second default gateway of the network in which the communication apparatus is connected. And, the control system prohibits the communication apparatus to access the network when it is judged that the communication apparatus is connected to the network which is other than the specific local network.

The present invention is characterized by using MAC addresses of the first and second default gateways as a judgment condition for controlling the firewall function of the communication apparatus as described above. The present invention is also characterized in that a server provided in a specific local network automatically acquires a MAC address of the first default gateway which is provided for the specific local network. Moreover, the present invention is characterized in that a client PC as the communication apparatus automatically acquires the MAC address which the server has acquired from the first default gateway provided for the specific local network and also acquires a MAC address of the second default gateway provided for a network in which the client PC is connected, and compares these MAC addresses for determining a location of the client PC whether it is the specific local network or not. Further, the present invention is characterized in that the client PC disables the firewall function of the client PC when it is determined that the location of the client PC is the specific local network, and the client PC enables the firewall function of the client PC when it is determined that the location of the client PC is not the specific local network.

Here, a case using a MAC address of default gateway has been described. However, actually, it is not limited to a case using a MAC address of default gateway. For example, a case using a MAC address allocated to a router, a proxy, a DNS server (Domain Name Server) may be considered, and a case using a MAC address allocated to a base station or an access point or the like may also be considered. That is, the present invention is feasible by using a MAC address allocated to any network device which is certainly accessed by the communication apparatus in the intranet.

A case using a specific number instead of a MAC address may also be considered. In this case, a product number or a serial number as the specific number allocated to hardware and software of the default gateway may be used, and the communication apparatus is so configured that it can control to acquire the specific number of hardware and software of the default gateway for the purpose of comparison as described in exemplary embodiments above.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A communication apparatus used in a plurality of networks and comprising:
   a firewall which is provided in the communication apparatus, allows communication with outside of the communication apparatus when disabled, and prohibits communication with outside of the communication apparatus when enabled;
   a MAC address automatic acquisition part which acquires a third MAC address of a first default gateway, through which communication is allowed for the communication apparatus, from a server provided in a predetermined specific network, in which communication is allowed for the communication apparatus, when the communication apparatus is connected in the predetermined specific network, wherein the server has an IP (Internet Protocol) address of the first default gateway and has obtained the third MAC address from the first default gateway in advance;
   a MAC address storing part which stores the third MAC address acquired by the MAC address automatic acquisition part;
   a MAC address acquisition part which acquires a second MAC address of a second default gateway for a network in which the communication is being connected when the communication apparatus is connected to any of networks; and
   a MAC address comparing part which compares the third MAC address and the second MAC address, determines whether the communication apparatus is currently being connected in the predetermined specific network or not based on the result of comparison, disables the firewall when the third MAC address coincides with the second MAC address and having determined that the communication apparatus is being connected in the predetermined specific network, and enables the firewall when the third MAC address does not coincide with the second MAC address and having determined that the communication apparatus is being connected in a network other than the predetermined specific network.

2. The communication apparatus according to claim 1, wherein,
   the MAC address storing part further stores a plurality of first MAC addresses set by an administrator in advance, wherein the first MAC address corresponds to a virtual first default gateway provided in a segmented area of the predetermined specific network; and
   the MAC address comparing part further compares the first MAC address and the second MAC address when the third MAC address is not available for comparison, determines whether the communication apparatus is currently being connected in an allowed segmented area of the predetermined specific network, which is allowed for the communication apparatus to communicate with outside of the communication apparatus, or not based on the result of comparison, disables the firewall when the first MAC address and the second MAC address are identical and having determined that the communication apparatus is being connected in the allowed segmented area of the predetermined specific network, and enables the firewall when the first MAC address and the second MAC address are not identical and having determined that the communication apparatus is being connected in a network other than the allowed segment area of the predetermined specific network.

3. The communication apparatus according to claim 1, wherein, the MAC address automatic acquisition part periodically acquires the third MAC address from the server, which periodically obtains the third MAC address from the first default gateway, and updates the third MAC address stored in the MAC address storing part periodically.

4. A method of controlling a firewall provided in a communication apparatus which is used in a plurality of networks and causing at least one processor or circuit to perform functions comprising:
   a first acquiring step for acquiring a third MAC (Media Access Control) address of a first default gateway, through which communication is allowed for the communication apparatus, from a server provided in a predetermined specific network, in which communication is allowed for the communication apparatus, when the communication apparatus is connected in the predetermined specified network, wherein the server has an IP (Internet Protocol) address of the first default gateway and has obtained the third MAC address from the first default gateway in advance;
   a second acquiring step for acquiring a second MAC address of a second default gateway for a network in which the communication apparatus is currently being connected when the communication apparatus is connected to any of networks;
   a comparing step for comparing the third MAC address and the second MAC address; and
   a controlling step for disabling the firewall when the third MAC address and the second MAC address are identical, and enabling the firewall when the third MAC address and the second MAC address are not identical, as a result of comparison of the comparing step,
   wherein, communication with outside of the communication apparatus is allowed when the firewall is disabled, and communication with outside of the communication apparatus is prohibited when the firewall is enabled.

5. The method according to claim 4, wherein,
   the first acquiring step includes a storing step for storing a plurality of first MAC addresses set by an administrator in advance, wherein the first MAC address corresponds to a virtual first default gateway provided in a segmented area of the predetermined specific network;
   the comparing step includes a third determining step for determining whether the communication apparatus is currently being connected in an allowed segmented area of the predetermined specific network, which is allowed for the communication apparatus to communicate with outside of the communication apparatus, or not based on the result of comparing the first MAC address and the second MAC address when the third MAC address is not available for comparison; and the controlling step includes a disabling step for disabling the firewall when the first MAC address and the second MAC address are identical and having determined that the communication apparatus is being connected in the allowed segmented area of the predetermined specific network, and a enabling step for enabling the firewall when the first MAC address and the second MAC address are not identical and having determined that the communication apparatus is being connected in a network other than the allowed segmented area of the predetermined specific network.

6. The method according to claim 4, wherein, the first acquiring step periodically acquires the third MAC address from the server, which periodically obtains the third MAC address from the first default gateway, and updates the third MAC address for comparison periodically.

7. A non-transitory computer readable storage medium having a firewall control program stored thereon to control a firewall provided in a communication apparatus which is used in a plurality of networks, for causing a processing device to execute:

a first acquiring step for acquiring a third MAC (Media Access Control) address of a first default gateway, through which communication is allowed for the communication apparatus, from a server provided in a predetermined specific network, in which communication is allowed for the communication apparatus, when the communication apparatus is connected in the predetermined specified network, wherein the server has an IP (Internet Protocol) address of the first default gateway and has obtained the third MAC address from the first default gateway in advance;

a second acquiring step for acquiring a second MAC address of a second default gateway for a network in which the communication apparatus is currently being connected when the communication apparatus is connected to any of networks;

a comparing step for comparing the third MAC address and the second MAC address; and a controlling step for disabling the firewall when the third MAC address and the second MAC address are identical, and enabling the firewall when the third MAC address and the second MAC address are not identical, as a result of comparison of the comparing step, wherein, communication with outside of the communication apparatus is allowed when the firewall is disabled, and communication with outside of the communication apparatus is prohibited when the firewall is enabled.

8. The non-transitory computer readable storage medium having a firewall control program stored thereon according to claim 7, wherein, the first acquiring step includes a storing step for storing a plurality of first MAC addresses set by an administrator in advance, wherein the first MAC address corresponds to a virtual first default gateway provided in a segmented area of the predetermined specific network;

the comparing step includes a determining step for determining whether the communication apparatus is currently being connected in an allowed segmented area of the predetermined specific network, which is allowed for the communication apparatus to communicate with outside of the communication apparatus, or not based on the result of comparing the first MAC address and the second MAC address when the third MAC address is not available for comparison; and the controlling step includes a disabling step for disabling the firewall when the first MAC address and the second MAC address are identical and having determined that the communication apparatus is being connected in the allowed segmented area of the predetermined specific network, and a enabling step for enabling the firewall when the first MAC address and the second MAC address are not identical and having determined that the communication apparatus is being connected in a network other than the allowed segmented area of the predetermined specific network.

9. The non-transitory computer readable storage medium having a firewall control program stored thereon according to claim 7, wherein, the first acquiring step periodically acquires the third MAC address from the server, which periodically obtains the third MAC address from the first default gateway, and updates the third MAC address for comparison periodically.

* * * * *